(12) United States Patent
Wu

(10) Patent No.: US 9,116,714 B2
(45) Date of Patent: Aug. 25, 2015

(54) METHODS AND SYSTEMS FOR FILE PROCESSING

(71) Applicant: TENCENT TECHNOLOGY (SHENZHEN) COMPANY LIMITED, Shenzhen (CN)

(72) Inventor: Yunjia Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/256,678

(22) Filed: Apr. 18, 2014

(65) Prior Publication Data

US 2015/0020056 A1    Jan. 15, 2015

Related U.S. Application Data

(63) Continuation of application No. PCT/CN2013/087830, filed on Nov. 26, 2013.

(30) Foreign Application Priority Data

Jul. 10, 2013    (CN) .................. 2013 1 02879983

(51) Int. Cl.
*G06F 9/45* (2006.01)
*G06F 9/44* (2006.01)

(52) U.S. Cl.
CPC .. *G06F 8/41* (2013.01); *G06F 8/30* (2013.01); *G06F 8/423* (2013.01); *G06F 8/427* (2013.01); *G06F 8/443* (2013.01); *G06F 8/447* (2013.01)

(58) Field of Classification Search
CPC ............. G06F 8/30; G06F 8/41; G06F 8/423; G06F 8/427; G06F 8/443; G06F 8/447
See application file for complete search history.

(56) References Cited

U.S. PATENT DOCUMENTS

| 6,594,783 | B1 * | 7/2003 | Dollin et al. | ................... 717/156 |
| 7,120,898 | B2 * | 10/2006 | Grover et al. | ................. 717/114 |
| 7,386,541 | B2 | 6/2008 | Pal et al. | |
| 8,881,122 | B1 * | 11/2014 | Klimek et al. | ................ 717/144 |

(Continued)

FOREIGN PATENT DOCUMENTS

CN    101788992 A    7/2010

OTHER PUBLICATIONS

Ramanathan et al., "Static Specification Inference Using Predicate Mining", 2007 ACM, Jun. 2007, PLDI'07, pp. 1-12; <http://dl.acm.org/results.cfm?h=1&cfid=678840066&cftoken=57943484>.*

(Continued)

*Primary Examiner* — Thuy Dao
*Assistant Examiner* — Ben C Wang
(74) *Attorney, Agent, or Firm* — Anova Law Group, PLLC

(57) ABSTRACT

The present disclosure relates to a method and system for file processing. The file processing method may include the steps of scanning a source files, identifying a target code block, and generating a first abstract syntax tree (AST) reflecting the structure of the target code block. The file processing method may further include the steps of identifying a position to place a plugin code, placing the plugin code into the first AST, generating a second AST reflecting the structure of the target code block with the plugin code, and using the write-back interface to write the second AST into the source file. The present disclosure may improve the efficiency and enhance the flexibility of the file processing system.

9 Claims, 6 Drawing Sheets

(56) References Cited

U.S. PATENT DOCUMENTS

| | | | |
|---|---|---|---|
| 2002/0169999 A1* | 11/2002 | Bhansali et al. | 714/26 |
| 2003/0051226 A1* | 3/2003 | Zimmer et al. | 717/102 |
| 2008/0244511 A1* | 10/2008 | Chaoweeraprasit et al. | 717/109 |
| 2009/0222799 A1* | 9/2009 | Stewart et al. | 717/143 |
| 2010/0037213 A1* | 2/2010 | Meijer et al. | 717/144 |
| 2010/0199269 A1* | 8/2010 | Hattori et al. | 717/146 |
| 2010/0269096 A1* | 10/2010 | Araya et al. | 717/113 |
| 2011/0283269 A1* | 11/2011 | Gass et al. | 717/168 |
| 2011/0283270 A1* | 11/2011 | Gass et al. | 717/168 |
| 2011/0296391 A1* | 12/2011 | Gass et al. | 717/168 |
| 2011/0321020 A1* | 12/2011 | McCabe et al. | 717/144 |
| 2012/0151453 A1* | 6/2012 | Finking et al. | 717/130 |
| 2013/0031536 A1* | 1/2013 | De et al. | 717/146 |
| 2014/0096113 A1* | 4/2014 | Kuehlmann et al. | 717/126 |

OTHER PUBLICATIONS

Horváth et al., "Clang Matchers for Verified Usage of the C++ Standard Template Library", Jan. 25, 2015, Eötvös Loránd University, Budapest, Hungary, pp. 1-11; <http://xazax.web.elte.hu/files/STLClang.pdf>.*

Duala-Ekoko et al., "Tracking Code Clones in Evolving Software", 2007 IEEE, May 2007, ICSE'07, pp. 1-10; <http://ieeexplore.ieee.org/stamp/stamp.jsp?tp=&arnumber=4222578>.*

The World Intellectual Property Organization (WIPO) International Search Report for PCT/CN2013/087830 Apr. 21, 2014.

* cited by examiner

METHODS AND SYSTEMS FOR FILE PROCESSING

CROSS-REFERENCES TO RELATED APPLICATIONS

Related Applications

This application is a continuation application of PCT Patent Application No. PCT/CN2013/087830, filed on Nov. 26, 2013, which is based upon and claims the benefit of priority from Chinese Patent Application No. 201310287998.3, filed Jul. 10, 2013, the entire contents of all of which are incorporated herein by reference.

FIELD OF THE INVENTION

The present disclosure relates to the field of computer software and file processing and, more particularly, relates to a method and system for source code file processing.

BACKGROUND

In software development projects, software developers often conduct performance optimization analysis or memory leak tests, which require detailed analysis of the source code function or segments of the source code. To identify bugs or provide guidance for further optimization, software developers often use monitoring programs to record the time consumption, storage consumption, central processing unit (CPU) consumption, etc., caused by certain functions or segments of source code. Software developers often use plugins to test or analyze the source code file.

A plugin refers to one or more software programs that can be placed into the source code without compromising the logical integrity of the source code. When the source code is being executed, the plugin code may output certain characteristic data related to the execution of the source code program. Software developers may then analyze and test the source code based on the output generated by the plugin code.

Very often, plugins are placed into the source code in the original compilation process. That is, depending on the build environment, a software developer may place a plugin into the source code and compile the code to obtain executable files. This process often requires the developer to analyze the whole source code file. When dealing with a large-scale program, this approach may require a considerable amount of work and may therefore be inefficient. In addition, when the source code with the plugins is compiled to generate executable files, the source code may not be further modified. This limits the flexibility in processing source code files.

The disclosed method and system are directed to solve one or more problems set forth above as well as other problems.

BRIEF SUMMARY OF THE DISCLOSURE

The present disclosure provides a method and system for file processing. This method may improve the efficiency and flexibility of a file processing system.

One aspect of the present disclosure provides a method for file processing. The file processing method may include the steps of scanning a source file, identifying a target code block, and generating a first abstract syntax tree (AST) reflecting the structure of the target code block. The file processing method may further include the steps of identifying a position to place a plugin code, placing the plugin code into the first AST, generating a second AST reflecting the inserted plugin code, and using the write-back interface to write the second AST into the source file.

Another aspect of the present disclosure provides a system for file processing. The system may include a filtering module, which scans a source file and identifies a target code block, and a confirming module, which generates a first AST representing the structure of the target code block, and identifies a position to place a plugin code. The system may further include a plugin processing module which places the plugin code into the first AST, and generates a second AST correspond to the target code block with the plugin code, and a writing-back module, which writes the second AST into the source file.

Embodiments consistent with the present disclosure implement a method that only processes a target code block without affecting the other code blocks in a source file. As a result, such embodiments may improve the efficiency of file processing. In addition, embodiments consistent with the present disclosure implement a method that writes back the second AST into the source file. Developers can therefore change the source file with plugins as needed before compiling the source file. This aspect of the embodiments enhances the flexibility of the file processing system.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are just some but not all embodiments of the present invention. Based on the disclosed embodiments, persons of ordinary skill in the art may derive other embodiments consistent with the present disclosure, all of which are within the scope of the present invention.

Figure 8:
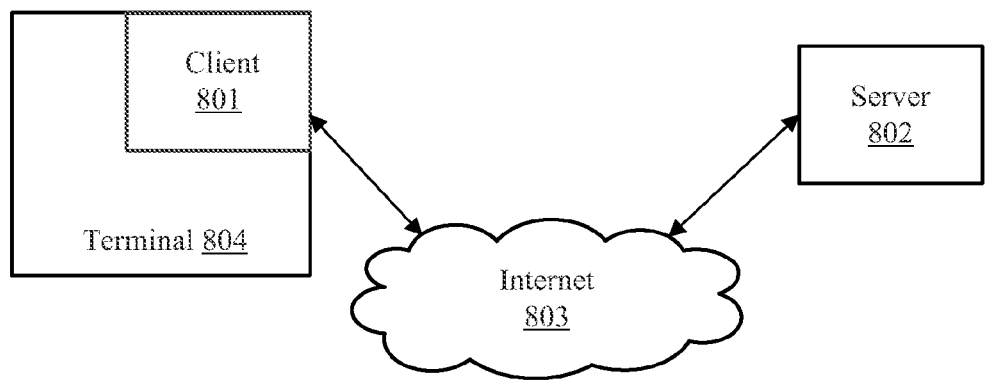
FIG. 8 illustrates an exemplary operating environment incorporating certain disclosed embodiments.

In the embodiments consistent with the present disclosure, a user of the disclosed system may be a software developer or a developer. A source file may be a source code file including one or more source code programs. A developer may write, edit, or compile various source files using a terminal and/or a server. FIG. 8 illustrates an exemplary operating environment 800 incorporating certain disclosed embodiments.

As shown in FIG. 8, environment 800 may include a terminal 804, the Internet 803, and a server 802. The Internet 803 may include any appropriate type of communication network for providing network connections to the terminal 804 and the server 802. For example, Internet 803 may include the Internet or other types of computer networks or telecommunication networks, either wired or wireless.

A server, as used herein, may refer to one or more server computers configured to provide certain functions and services, which may require a developer accessing the services through a network. A server may include one or more processors to execute computer programs in parallel.

The server 802 may include any appropriate server computers configured to provide certain server functionalities, such as storing source files and compiling source files. Although only one server is shown, any number of servers can be included. The server 802 may be operated in a cloud or non-cloud computing environment.

Terminal 804 may include any appropriate type of mobile or other computing devices, such as a mobile phones, smart phones, tablets, notebook computers, or any type of computing platform. Terminal 804 may include one or more clients 801. The client 801, as used herein, may include any appropriate application software, hardware, or a combination of application software and hardware to achieve certain client functionalities. For example, client 801 may include a source code editor or a source code compiler interface. According to actual needs in different terminals, a mobile client may be a compiler interface installed on a mobile terminal for compiling source code. Although only one client 801 is shown in the environment 600, any number of clients 801 may be included.

Figure 9:
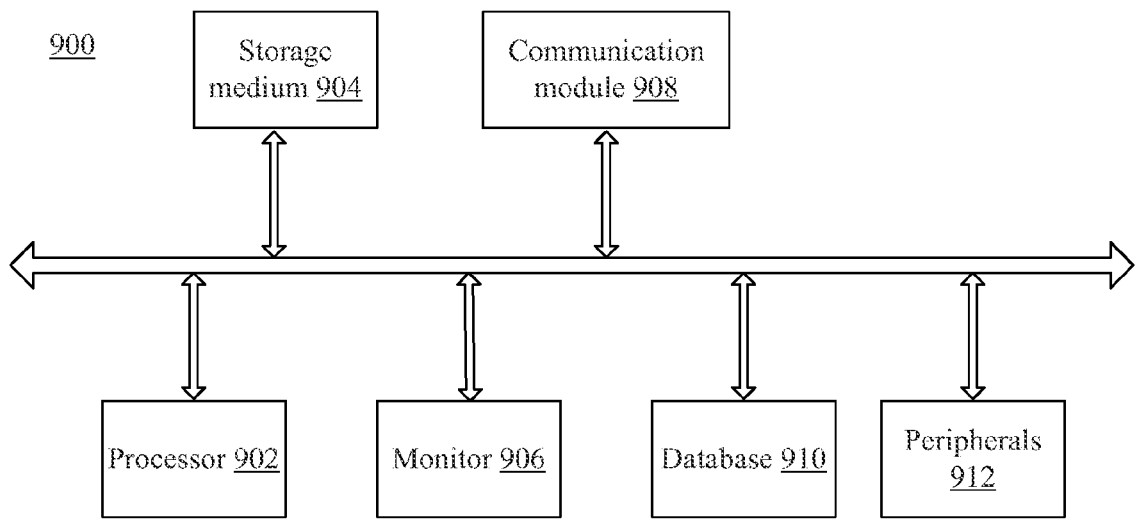
FIG. 9 illustrates a block diagram of an exemplary computer system consistent with the disclosed embodiments.

Terminal 804 and/or server 802 may be implemented on any appropriate computing platform. FIG. 9 illustrates a block diagram of an exemplary computer system 900 capable of implementing terminal 804 and/or server 802.

As shown in FIG. 9, computer system 900 may include a processor 902, a storage medium 904, a monitor 906, a communication module 908, a database 910, and peripherals 912. Certain devices may be omitted and other devices may be included herein.

Processor 902 may include any appropriate processor or processors. Further, processor 902 can include multiple cores for multi-thread or parallel processing. Storage medium 904 may include memory modules, such as Read-only memory (ROM), Random Access Memory (RAM), flash memory modules, and erasable and rewritable memory, and mass storages, such as CD-ROM, U-disk, and hard disk, etc. Storage medium 904 may store computer programs for implementing various processes, when executed by processor 902.

Further, peripherals 912 may include I/O devices such as a keyboard and mouse, and communication module 908 may include network devices for establishing connections through the communication network. Database 910 may include one or more databases for storing certain data and for performing certain operations on the stored data, such as database searching.

In operation, terminals/clients 804/801 may provide a source code editing or complier interface to a user, such as a software developer. Server 802 may compile the source code file to generate executable files.

Figure 1:
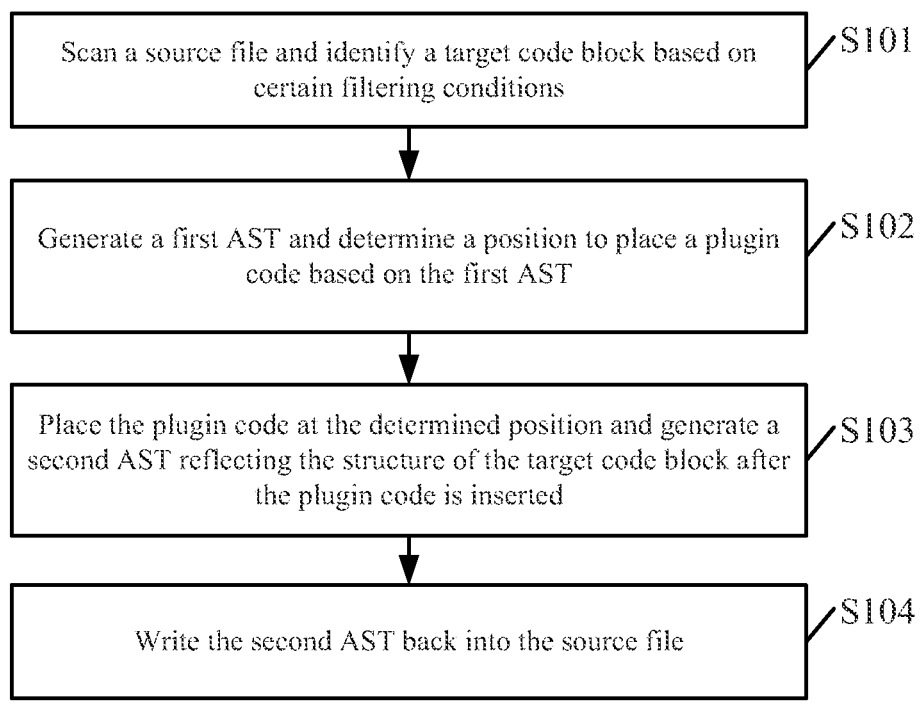
FIG. 1 is a flowchart of an exemplary file processing method consistent with the present disclosure.
Figure 2:
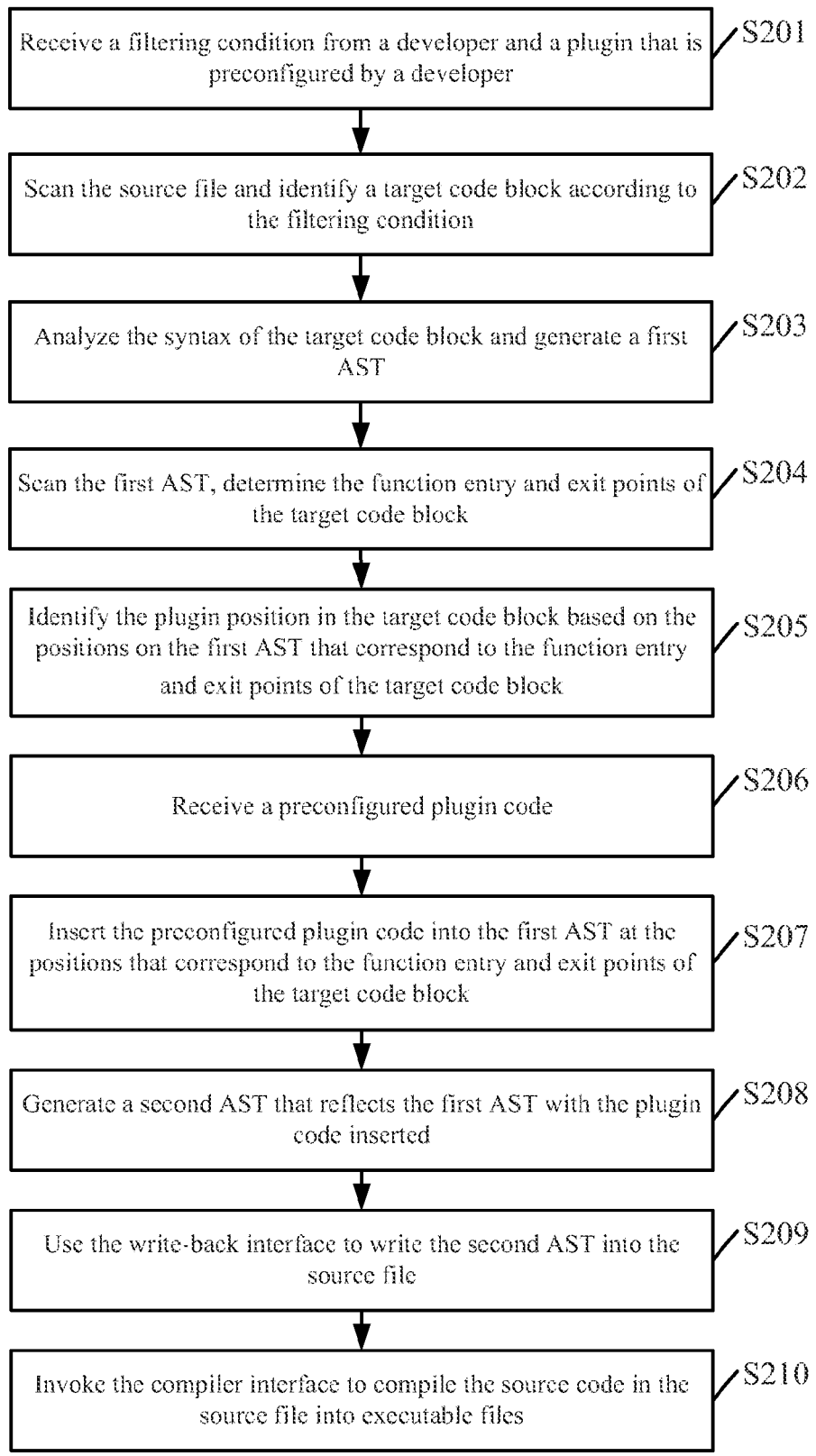
FIG. 2 is another flowchart of an exemplary file processing method consistent with the present disclosure.
Figure 3:
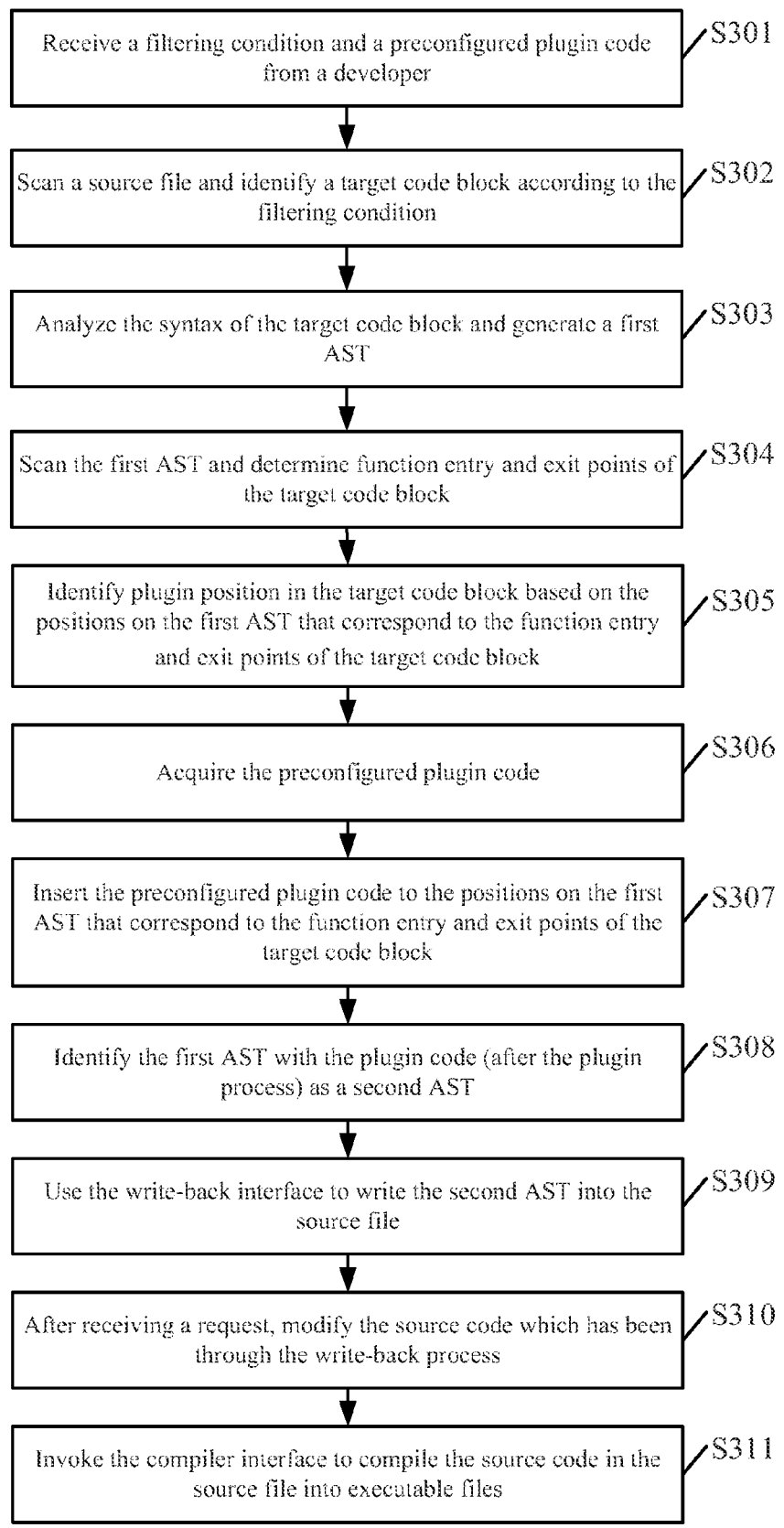
FIG. 3 is another flowchart of an exemplary file processing method consistent with the present disclosure.

FIGS. 1-3 provide detailed descriptions of exemplary file processing methods implemented by embodiments consistent with the present disclosure. FIG. 1 shows a flowchart of a file processing method used by embodiments consistent with the present disclosure. The method may comprise steps S101-S104.

In step S101, a file processing system may scan a source file and identify a target code block based on certain filtering conditions. The source file may be a file containing one or more source code programs. In this step, according to the preset filtering conditions, the file processing system may scan code blocks in the source file to identify a target code block. For example, the system may identify a loop branch, a conditional branch, or an input/output branch code block as a target code block. Further, developers may preset the filtering conditions. For example, the filtering condition may be to identify a target code block if the code block is a loop branch, a conditional branch, or an input/output branch.

In embodiments consistent with the present disclosure, the file processing system processes only the target code block. The file processing system does not further process code blocks that are filtered out based on the filtering conditions. The filtering process thus helps reduce the resource consumption caused by potentially handling the entire source file (instead of only the target code block) and improve the efficiency of the process.

In step S102, the file processing system may generate a first AST and determine a position to place a plugin code based on the first AST. An AST refers to an abstract syntax tree, which is a tree shaped representation of the syntax of a source code program. Each node on an AST represents a logic structure of the source code. In this step, the first AST shows the tree shaped abstract structure of the target code block. Once the system scans the first AST, it may determine the position to place the plugin code.

In step S103, the file processing system may place the plugin code at the determined position on the first AST. The system may then generate a second AST reflecting the structure of the target code block after the plugin code is inserted. This process of placing the plugin code at the determined position on the AST may be referred to as the plugin process. The objective of the plugin process is to place the plugin code at the positions in the target code block corresponding to the determined insertion positions on the AST so that the file processing system may monitor and analyze the target code block.

A developer may preconfigure the plugin code. In this step, after the plugin code is inserted into the first AST at the determined position, the system may then generate the second AST. The second AST reflects the structure of the target code block after the plugin code is inserted.

In step S104, the write-back interface may write the second AST back into the source file. After the write-back process, the source file may include the plugin code. Developers can further change the source file with the plugin as needed, which enhances the flexibility of the file processing system.

FIG. 2 shows the flow chart of a method implemented by embodiments consistent with the present disclosure. The method comprises steps S201-S210.

In step S201, the file processing system may receive a filtering condition from a developer and a plugin that is preconfigured by a developer. The filtering condition may be to identify a target code block if a branch code block is a loop branch code block, a conditional branch code block, or an input/output branch code block, etc. In this step, a software developer may use a user interface to provide the filtering condition or preconfigure the plugin code.

In step S202, the file processing system may scan the source file and identify a target code block according to the filtering condition. This step is the explained in step S101 of FIG. 1, the descriptions of which are not repeated here.

In step S203, the file processing system may analyze the syntax of the target code block and generate a first AST. The AST does not depend on the language structure of the source language. Thus, the syntax analysis process does not differ based on the context before or after the target code block. In this step, based on the syntax analysis of the target code block, the system may generate a first AST. The processes for AST generation are known in the art.

In step S204, the file processing system may scan the first AST, and determine the function entry and exit points of the target code block. In this step, by scanning the first AST, i.e., traversing the nodes of the first AST, the file processing system may determine the function entry and exit points of the target code block and therefore determine the positions on the first AST that correspond to the function entry and exit points of the target code block.

In step S205, the file processing system may identify the plugin position in the target code block based on the positions on the first AST that correspond to the function entry and exit points of the target code block. Steps S203-S205 of the current embodiment are detailed steps of step S102 in FIG. 1, the descriptions of which are not repeated here.

In step S206, the file processing system may receive a preconfigured plugin code. In step S207, the file processing system may insert the preconfigured plugin code into the first AST at the positions that correspond to the function entry and exit points of the target code block. This step may also be referred to as the plugin process for the target code block.

In step S208, the file processing system may generate a second AST. The second AST may be the first AST with the plugin code inserted. After the first AST has been through the plugin process, a new AST including the first AST and the preconfigured plugin code may be generated. This new AST may be referred to as the second AST, which represents the abstract structure of the target code block after the plugin process. Steps S206-S208 of the current embodiment are detailed steps of step S103 in FIG. 1, the descriptions of which are not repeated here.

In step S209, the file processing system may use the write-back interface to write the second AST into the source file. This step is the same as step S104 of FIG. 1, the descriptions of which are not repeated here.

In step S210, the file processing system may invoke the compiler interface to compile the source code in the source file into executable files. In this step, after the system invokes the complier interface to compile the source the source code into executable code, the process of compiling the source code is completed. It can be understood that after the executable files are generated, executing these files would realize the functions of the code blocks in the source file and the functions of the plugin code.

FIG. 3 shows the flow chart of a method implemented by embodiments consistent with the present disclosure. The method comprises steps S301-S310.

In step S301, the file processing system may receive a filtering condition and a preconfigured plugin code from a developer. In step S302, the file processing system may scan a source file and identify a target code block according to the filtering condition. In step S303, the file processing system may analyze the syntax of the target code block and generate a first AST. In step S304, the file processing system may scan the first AST, determine function entry and exit points of the target code block. In step S305, the file processing system may identify a plugin position in the target code block based on the positions on the first AST that correspond to the function entry and exit points of the target code block. In step S306, the file processing system may acquire the preconfigured plugin code. In step S307, the file processing system may insert the preconfigured plugin code to the positions on the first AST that correspond to the function entry and exit points of the target code block. In step S308, the file system may identify the first AST with the plugin code, i.e., after the plugin process, as a second AST. In step S309, the file processing system may use the write-back interface to write the second AST into the source file. Steps S301-S309 implemented by embodiments consistent with the present disclosure are the same as steps S201-S209 of FIG. 2, the descriptions of which are not repeated here.

In step S310, after receiving a request to modify the source file, the system may modify the source code, which has been through the write-back process. After the write-back process in step S309, the source file includes the original code blocks and the plugin code. In this step, upon a request by a user, such as a software developer, the file processing system can further modify the source file with the plugin as needed, which enhances the flexibility of the file processing system.

In step S311, the file processing system may invoke the compiler interface to compile the source code in the source file into executable files. This step is the same as step S210 of FIG. 2, the descriptions of which are not repeated here.

Embodiments consistent with the disclosure of FIGS. 1-3 implement a method that only processes the target code block without affecting the other code blocks. As a result, such embodiments may improve the efficiency of file processing. In addition, embodiments consistent with the present disclosure implement a method that writes back the second AST into the source file. Developers can therefore further change the source file with plugins as needed. This aspect of the embodiments enhances the flexibility of the file processing system.

It should be noted that the file processing method disclosed in FIGS. 1-3 could be implemented by a file processing system. The file processing system may be based on the executable files created by a simple complier. For example, the file processing system may be based on executable files created by the Clang complier. The file processing system may include the functions such as scanning the source file, generating ASTs, implementing the plugin process, and compiling the source code. The languages of the source code may include, but are not limited to, C, C++, Objective-C, etc.

Below with reference to FIGS. 4-7, the structures of an embodiment consistent with the present disclosure, i.e., a file processing system, is described in detail. FIGS. 4-7 show a file processing system for carrying out the methods described in FIGS. 1-3. For convenience of description, the descriptions below only describe an embodiment with the relevant parts. Please refer to the embodiments disclosed in relation to FIGS. 1-3 for the specific technical details not discussed below.

Figure 4:
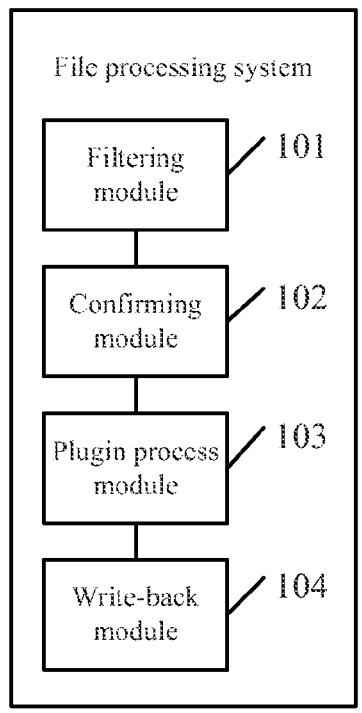
FIG. 4 is a block diagram of an exemplary file processing system consistent with the present disclosure.

FIG. 4 is a block diagram of a file processing system consistent with the present disclosure. The file processing system may include a filtering module 101, a confirming module 102, a plugin process module 103, and a write-back module 104.

The filtering module 101 may scan a source file, and identify a target code block according to preset filtering conditions. The source file may include one or more source code programs. Developers may preset the filtering conditions. For example, a filtering condition may be to identify a target code block at a branch code block if the branch code block is a loop branch code block, a conditional branch code block, or an input/output branch code block. In this step, according to the preset filtering conditions, the file processing system may scan code blocks to identify a target code block in the source file. For example, the system may identify a loop branch code block, a conditional branch code block, or an input/output branch code block as a target code block.

It should be noted that in embodiments consistent with the present disclosure, only the target code block would be further processed. Code blocks that are filtered out by the file processing system do not need to be further processed. The filtering process thus helps reduce resource consumption caused by potentially handling the entire source file (instead of only the target code block) and improve the efficiency of the process.

The confirming module 102 may generate a first AST and determine the position to place a plugin based on the first AST. In this step, the first AST shows the tree shaped abstract structure of the target code block. Once the system scans the first AST, it may determine the position to place a plugin code.

The plugin processing module 103 may place the plugin code at the determined position on the first AST. The system may then generate a second AST reflecting the structure of the target code block after the plugin code is inserted. The objective of a plugin process is to place the plugin code at the determined insertion point so that the system may monitor and analyze the target code block. A developer may preconfigure the plugin code. In this step, after the plugin code is inserted into the first AST at the determined position, the system may them generate the second AST. The second AST reflects the structure of the target code block after the plugin code is inserted.

The write-back module 104 may write the second AST back into the source file. After the write-back process, the source file includes the plugin code. Developers can change the source file with the plugin as seeded, which enhances the flexibility of file processing.

Figure 5:
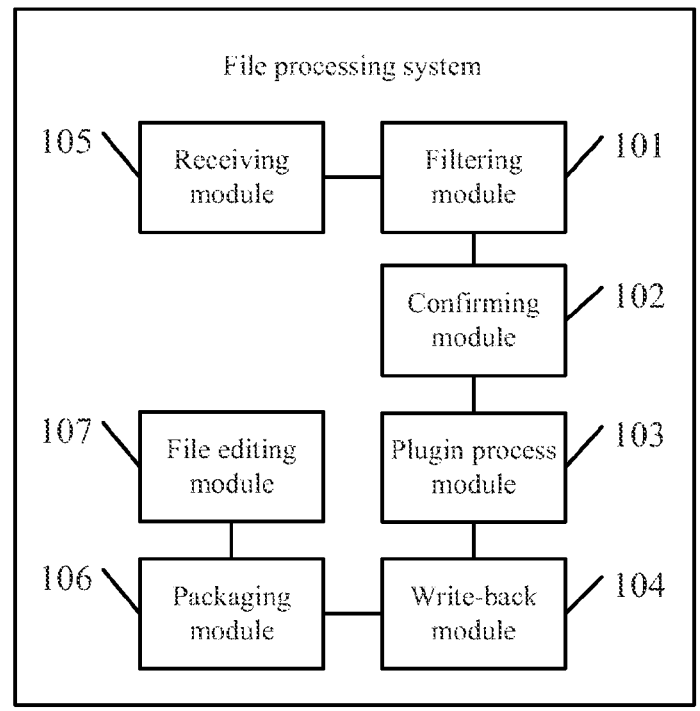
FIG. 5 is another block diagram of an exemplary file processing system consistent with the present disclosure.

FIG. 5 is another block diagram of a file processing system consistent with the present disclosure. The file processing system may include a filtering module 101, a confirming module 102, a plugin process module 103, and a write-back module 104. In this embodiment, the file processing system may also include a receiving module 105, a packaging module 106, and a file editing module 107. The filtering module 101, confirming module 102, plugin process module 103, and write-back module 104 are described above in relation to FIG. 4, the descriptions of which are not repeated here.

The receiving module 105 may receive the filtering condition from a developer and the plugin code preconfigured by a developer. The filtering condition may be to identify a target code block at the branch code block if the branch code block is a loop branch code block, a conditional branch code block, or an input/output branch code block, etc. In this step, a software developer may use a user interface to provide the filtering condition or preconfigure the plugin code.

The packaging module 106 may invoke a compiler interface to compile the source code in the source file into executable files. After the packaging module 106 invokes the complier interface to compile the source code into executable code, the compilation process is completed. It can be understood that after the executable files are generated, executing these files would realize the functions of the code blocks in the source file and the functions of the plugin code.

The file editing module 107 may edit the source file, which has gone through the write-back process. After the write-back process executed by the write-back module 104, the source file includes the original code blocks and the plugin code. In this step, upon a request by a user, such as a software developer, the file processing system can modify the source file with the plugin as needed, which enhances the flexibility of file processing.

Figure 6:
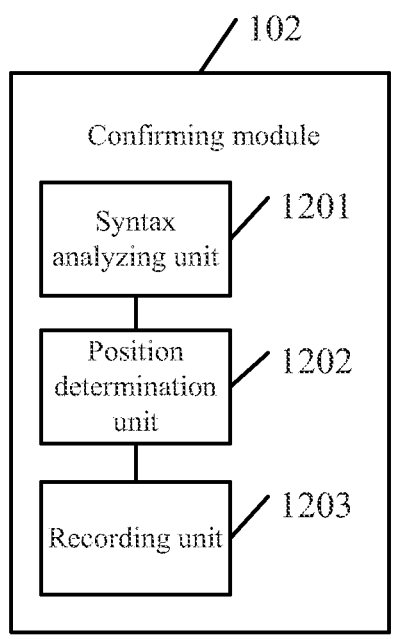
FIG. 6 is a block diagram of an exemplary confirming module of a file processing system consistent with the present disclosure.

FIG. 6 is a block diagram of the confirming module 102 consistent with the present disclosure. The confirming module 102 may include a syntax analyzing unit 1201, a position determination unit 1202, and a recording unit 1203.

The syntax analyzing unit 1201 may analyze the syntax of the target code block and generate the first AST. The AST does not depend on the language structure of the source language. Thus, the syntax analysis process does not differ based on the context before or after the target code block. In this step, based on the syntax analysis of the target code block, the system may generate a first AST. The processes for AST generation are known in the art.

The position determination unit 1202 may scan the first AST, determine the function entry and exit points of the target code block. By scanning the first AST, i.e., traversing the nodes of the first AST, the position determination unit 1202 may determine the function entry and exit points of the target code block and therefore determine positions on the first AST that correspond to the function entry and exit points of the target code block.

The recording unit 1203 may record the positions on the first AST that correspond to the function entry and exit points of the target code block as the plugin positions.

Figure 7:
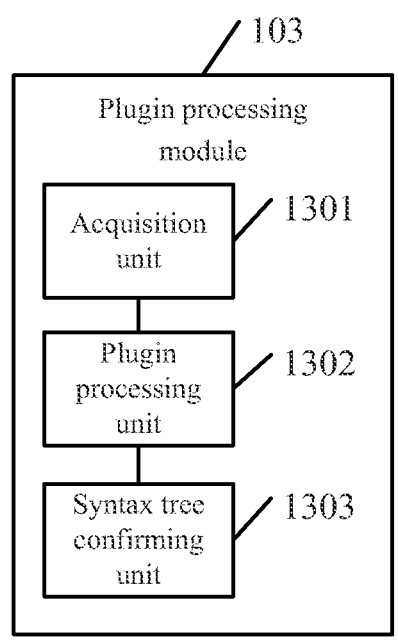
FIG. 7 is a block diagram of an exemplary plugin processing module of a file processing system consistent with the present disclosure.

FIG. 7 is a block diagram of the plugin processing module 103 consistent with the present disclosure. The plugin processing module 103 may include an acquisition unit 1301, a plugin processing unit 1302, and a syntax tree confirming unit 1303.

The acquisition unit 1301 may acquire the preconfigured plugin code. The plugin processing unit 1302 may insert the preconfigured plugin code into the positions on the first AST that correspond to the function entry and exit points of the target code block. The syntax tree confirming unit 1303 may generate the second AST based on the first AST with the added plugin code.

After the plugin code is inserted into the target code block at the determined position, the syntax tree confirming unit 1303 may then generate the second AST. The second AST reflects the structure of the target code block after the plugin code is inserted.

Embodiments consistent with the disclosure of FIGS. 4-7 implement a method that only processes the target code block without affecting the other code blocks. As a result, such embodiments may improve the efficiency of file processing. In addition, embodiments consistent with the present disclosure implement a method that writes back the second AST into the source file. Developers can therefore further change the source file with plugins as needed. This aspect of the embodiments enhances the flexibility of the file processing system.

It should be noted that the file processing system disclosed in FIGS. 4-7 could be implemented by a file processing system. The file processing system may be based on the executable files created by a simple complier not dependent on the how the compiler environment processes the source file. For example, the file processing system may be based on executable files created by the Clang complier. The file processing system may include the functions such as scanning the source file, generating ASTs, implementing the plugin process, and compiling the source code. The languages of the source code may include, but are not limited to, C, C++, Objective-C, etc.

Consistent with embodiments of the present disclosure, one or more non-transitory storage medium storing a computer program are provided to implement the system and method for file processing. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various file processing methods may be implemented. For example, a software developer may use the disclosed methods to first identify a target code block in a large source file and then place a plugin to monitor the resources consumed by the target code block. Instead of monitoring the resource consumption of all code blocks, the developer may only need to monitor the target code block. As a result, the software developer may efficiently analyze the performance of the target code block.

What is claimed is:

1. A method for file processing implemented by a software compiler stored in a non-transitory storage medium, the method comprising:
   scanning a source file and identifying a target code block based on a preset filtering condition;
   generating a first abstract syntax tree (AST) reflecting a structure of the target code block_and identifying a plugin position in the target code block using the first AST;
   inserting a plugin code into the first AST based on the plugin position, wherein the plugin code is used to monitor resources consumed by the target code block;
   generating a second AST reflecting a structure of the target code block after the plugin code has been inserted;
   using a write-back interface to write the second AST into the source file; and
   invoking a complier interface to compile the source file with the plugin codes produced by the write-back interface into executable files, wherein executing the executable files realizes functions of the target code block and functions of the plugin code such that information about the resources consumed by the target code block is obtained; and
   wherein when receiving a request from a user, the source file with the plugin codes produced by the write-back interface is further modified by the user.

2. The method according to claim 1, wherein identifying the plugin position in the target code further comprises:
   analyzing syntax of the target code block and generating the first AST reflecting the structure of the target code block based on the analysis;
   scanning the first AST and identifying a plugin position on the first AST that corresponds to a function entry and exit position in the target code block; and
   identifying the plugin position in the target code block based on the plugin position identified on the first AST.

3. The method according to claim 2, wherein inserting a plugin code into the first AST based on the plugin position and generating a second AST reflecting the target code block after the plugin code has been inserted further comprises:
   acquiring a preconfigured plugin code;
   inserting the preconfigured plugin code into the first AST based on the plugin position on the first AST that corresponds to the function entry and exit position in the target code block; and
   generating the second AST reflecting the structure of the target coded after the plugin code has been inserted.

4. The method according to claim 1, further comprising:
   receiving the filtering condition preset by a user and receiving a preconfigured plugin code preconfigured by a user, wherein the filtering condition includes identifying a loop branch code block, a conditional branch code block, or an input/output branch code block.

5. A system for file processing, comprising:
   one or more processors;
   memory; and
   one or more program modules stored in the memory and to be executed by the one or more processors, the one or more program modules including:
   a filtering module configured to scan a source file and to identify a target code block based on a preset filtering condition;
   a confirming module configured to generate a first AST reflecting a structure of the target code block and identify a plugin position in the target code block based on the first AST;
   a plugin processing module configured to insert a plugin code into the first AST based on the plugin position and generate a second AST reflecting a structure of the target code block after the plugin code has been inserted, wherein the plugin code is used to monitor resources consumed by the target code block;
   a write-back module configured to write the second AST into the source file;
   a packaging unit configured to invoke a complier interface to compile the source file with the plugin codes produced by the write-back interface into executable files, wherein executing the executable files realizes functions of the target code block and functions of the plugin code such that information about the resources consumed by the target code block is obtained; and
   a file editing module configured to allow a user to edit the source file with the plugin codes produced by the write-back module.

6. The system according to claim 5, the confirming module further comprising:

a syntax analyzing unit configured to analyze syntax of the target code block and generate the first AST reflecting the structure of the target code block based on the analysis;

a position determination unit configured to scan the first AST and identifying a plugin position on the first AST that corresponds to a function entry and exit position in the target code block; and a recording unit configured to identify the plugin position in the target code block based on the plugin position identified on the first AST.

7. The system according to claim 6, the plugin processing module further comprising:

an acquisition unit configured to acquire a preconfigured plugin code;

a plugin processing unit configured to insert the preconfigured plugin code into the first AST based on the plugin position on the first AST that corresponds to the function entry and exit position in the target code block; and a syntax tree confirming unit configured to generate a second AST reflecting the structure of the target coded after the plugin code has been inserted.

8. The system according to claim 5, further comprising:

a receiving module configured to receive the filtering condition preset by a user and to receive a preconfigured plugin code preconfigured by a user, wherein the filtering condition includes identifying a loop branch code block, a conditional branch code block, or an input/output branch code block.

9. A non-transitory storage medium containing a software compiler for implementing a method for file processing, the method comprising:

scanning a source file and identifying a target code block in a source file based on a preset filtering condition;

generating a first abstract syntax tree (AST) reflecting a structure of the target code block and identifying a plugin position in the target code block using the first AST;

inserting a plugin code into the first AST based on the plugin position, wherein the plugin code is used to monitor resources consumed by the target code block;

generating a second AST reflecting a structure of the target code block after the plugin code has been inserted;

using a write-back interface to write the second AST into the source file;

invoking a complier interface to compile the source file with the plugin codes produced by the write-back interface into executable files, wherein executing the executable files realizes functions of the target code block and functions of the plugin code such that information about the resources consumed by the target code block is obtained; and wherein when receiving a request from a user, the source file with the plugin codes produced by the write-back interface is further modified by the user.

* * * * *